J. GARDNER.
SUBMARINE SOUND SIGNALING.
APPLICATION FILED MAR. 10, 1908.

1,006,079.

Patented Oct. 17, 1911.

Witnesses:

Inventor,
John Gardner
by
Rosenbaum & Stockbridge
Attys.

UNITED STATES PATENT OFFICE.

JOHN GARDNER, OF KNOTT END, NEAR FLEETWOOD, ENGLAND.

SUBMARINE SOUND-SIGNALING.

1,006,079. Specification of Letters Patent. Patented Oct. 17, 1911.

Application filed March 10, 1908. Serial No. 420,142.

*To all whom it may concern:*

Be it known that I, JOHN GARDNER, a subject of the King of Great Britain and Ireland, and a resident of Knott End, near Fleetwood, in the county of Lancaster, England, have invented new and useful Improvements in and Relating to Submarine Sound-Signaling, of which the following is a specification.

In the specification to my British Letters Patent 11021 of 1906 I have described the employment at a submarine sound signaling receiving station of microphonic or similar contacts or electrodes arranged upon a diaphragm capable of vibration, or upon an equivalent part, in such a manner and so directly combined in a local electric circuit with a source of current and an operative device that when the vibratory part is vibrated upon the arrival of sound the current flowing through the contacts or electrodes is lessened or the current flow is rapidly intermittently broken or interrupted and the operative device is released to either itself give a signal or to control a further local circuit or further local circuits and any included instrument or instruments. Such vibratory part may be the diaphragm of a telephonic receiver or equivalent electro-magnetic device contained in circuit with a telephonic transmitter by which the sounds are received.

The present improvements relate to the construction and disposition of the contacts or electrodes upon the diaphragm or equivalent (hereinafter referred to as a vibratory element) with the object of obtaining the greatest possible amount of variation of conductivity through and between the electrodes with the minimum amount of "damping" of or interference with the vibrations of the vibratory element or the like. They also relate to the resistance and current employed in the local circuit in which the microphonic electrodes are included.

The vibratory strip element may be fixed at one end only, or be fixed at both ends, and be tuned or tunable or selective, and it may be provided with a weight or armature over the magnets of the receiver or equivalent electro-magnetic device, all being formed arranged and disposed as described and illustrated in the before mentioned British specification.

It is with a weighted strip secured at both ends that I obtain the best results, and it is in connection with such a weighted diaphragm that I will now particularly describe my invention and have illustrated it in the accompanying drawings to which reference will be made.

Figure 1:
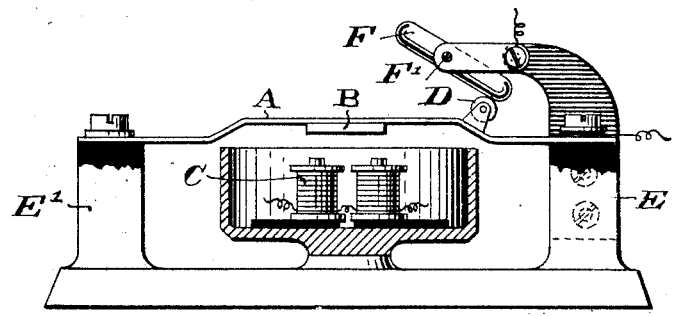
Figure 2:
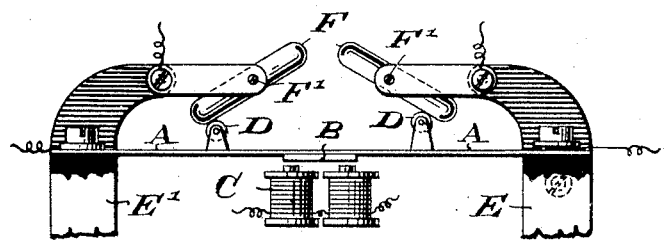
Figure 3:
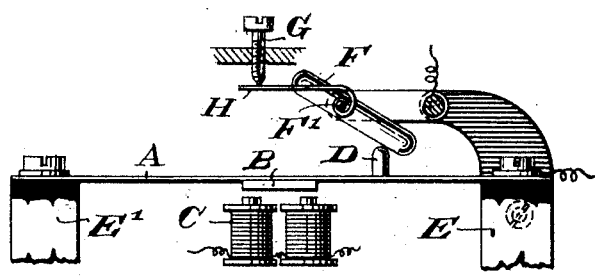

Figure 1 shows such a strip with one microphonic electrode attached to it. Fig. 2 shows a similar strip with two similar electrodes combined with it. Fig. 3 illustrates a single electrode strip with a spring adjustment device for varying the pressure between coöperating electrodes, and which pressure varying device may be similarly applied to the electrodes of a strip diaphragm with two electrodes fixed thereon.

In Fig. 1 the extreme upward position attained by the strip during its vibration is shown in an exaggerated form. In Figs. 2 and 3 the strip is illustrated as in its position of repose.

A indicates the metallic strip which is weighted or is formed with a magnetic armature B placed at about its central part. Poles of an electro-magnet C are disposed beneath such armature at a proper distance so as to actuate or vibrate the strip upon the proper electro-magnetic fluctuations being set up in the magnet poles. With a strip A disposed in about the horizontal plane indicated, a carbon microphonic contact or electrode D is attached thereto at a point about or precisely halfway between the inner edge of one of the brackets E or $E^1$ by which the diaphragm strip is held, and the nearer edge of the attached weight or armature, so that its point of contact with the hereinafter described second electrode F is about above such half way point. The electrode D may be rigidly attached to and be solid with the strip A as shown in the drawings or it may consist of a part movable upon the strip, as for example a small carbon bowl or roller suitably mounted within a support which is itself attached to the strip at the point indicated. The second electrode F is a strip or finger of carbon suitably pivoted or mounted as at the point $F^1$ in such a manner that it can be moved upward from the first electrode D or fall by gravity thereon. It is so counterweighted or balanced that it normally just rests upon the first electrode with sufficient weight to maintain good electrical contact, but so as to be freely movable. The angle at which the second electrode is disposed is important with respect to the best results being obtained and will be indicated later. In a preferred form the pencil points downward from its support or pivot and is above the strip and in the same plane.

With the electrodes in contact with each other as described and included in a closed electrical circuit with a source of current the current flows when the strip is quiescent. When the strip is vibrated as a result of the arrival of its appropriate sound at the receiving microphone or transmitter the resistance of or between the electrodes rapidly intermittently increases or the circuit is there rapidly intermittently broken, as the pivoted electrode (as a result of such vibration) is thrown away from the fixed electrode or otherwise rapidly and intermittently leaves it or decreases its pressure thereon and returns thereto, with the result that less current flows through the local circuit during the continuance of the vibrations of the strip, and any electro-magnetic device included in such circuit and which has a suitable part held over by the influence of the normal current in a certain position against a spring or the like is released or moved to give a signal or close a further local circuit or further local circuits which may contain a signaling or other device or devices. The inclusion of such an electro-magnetic device in the microphone circuit, the manner of its operation, and the arrangement of the circuit or circuits are fully described in my said British specification and are not further described herein.

With a weighted strip of the nature indicated and as illustrated in the drawings, I have found that the lines taken up by the strip during vibration are not smooth and regular curves, but that the central part of the strip carrying the weight moves approximately bodily up and down or to and fro, and that the parts of the strip which are adjacent to the supports or brackets are stiffly held and scarcely vibrated at all under the influence of the magnets. There is not the usual smooth continuous curve extending from the part having least vibration to the part having most, but there is a somewhat abrupt descent or step leading from the central part of the strip to the parts of the strip which are nearer the supports. Upon one of the parts (see Fig. 1) in which such an abrupt step is formed (or upon both as in the modification shown in Fig. 2) the first electrode or contact D is fixed. In order to obtain the best results the second and pivoted electrode F is so mounted that a line drawn from its pivot or support to its point of contact with the electrode D is about parallel to the abrupt step or descent in the strip when the strip is in its extreme outward position and as illustrated in Fig. 1, and such line is about at right angles to the path followed by the first electrode at or about its extreme outward position. Both electrodes move or are capable of moving in about the same vertical plane.

The microphonic electrodes may be similarly and relatively disposed to each other and to a magnetic strip diaphragm when such diaphragm is not weighted. In such a strip a more regular curve will be followed from the point of greatest amplitude of vibrations to the point of least, but the pencil or like electrode will be similarly mounted so that its general line or axis is about at right angles to the path followed by the vibrating electrode which is fixed to the strip.

The most advantageous results are obtained when the local circuit containing the microphonic electrodes possesses high resistance, and especially when such resistance is concentrated in the relay or other electro-magnetic device employed in such circuit. The current employed should have a very low E. M. F. With such a current and resistance arcing at the electrodes is reduced to a minimum. As such arcs would be conducting, their suppression enables the very greatest variation of current to be obtained with the very faintest vibration, in fact with an amount of vibration that is imperceptible under a strong magnifying glass. As an example of a convenient resistance and E. M. F. the former may be two thousand ohms and the latter 1.5 volts.

The effect of the current variation in the local circuit may be increased, as shown in Fig. 2, by using two contacts on a single strip and disposing a pencil electrode in combination with each such contact. The different pairs of electrodes may be in either parallel or series circuit in one and the same local circuit, preferably in series to give a great variation of a weak current and in parallel for a smaller variation of a heavier current.

The amount of pressure normally exerted by a pencil electrode upon a fixed one may be varied as desired by means, for example, of a light spring H one end of which is secured to the pivot $F^1$ which is fixed in the pencil, and the other end of which may be engaged by a movable screw G passing through a suitable bracket or support. By rotating the screw in one direction or the other the amount of pressure exerted by the pencil F may be varied as desired.

The pivot $F^1$ may be replaced by any other convenient means of suspension or support for the pencil electrode.

Obviously, in the construction shown wherein the strip is supported at both ends, one support can be omitted; and hence I do not wish to be limited in any sense to the vibratory element supported at both ends, nor do I wish to be limited to a weighted vibratory element or strip.

I claim:—

1. In sound receiving apparatus for signaling and the like, an electro-magnetic device, a vibratory strip element operable by such electro-magnetic device, an electrode attached to such vibratory element about half way between that part of such element which is opposite to the magnet poles and the support of such element, a second electrode suspended to normally rest upon and in conducting contact with the first electrode in such a manner that a line drawn from its point of suspension to its point of contact is substantially at right angles to the line of movement of the first electrode only when the latter is approximately at its extreme outer position, substantially as hereinbefore described.

2. In sound receiving apparatus for signaling and the like, an electro-magnetic device, a vibratory strip element operable by such electro-magnetic device, a weight attached to the vibratory element opposite to the poles of the electro-magnetic device, an electrode attached to such vibratory element about half way between such weight and the support of the element, a second electrode suspended to normally rest upon and in conducting contact with the first electrode in such a manner that a line drawn from its point of suspension to its point of contact is substantially at right angles to the line of movement of the first electrode only when the latter is approximately at its extreme outer position, substantially as hereinbefore described.

3. In sound receiving apparatus for signaling and the like, an electro-magnetic device, a vibratory strip element operable by such electro-magnetic device, an electrode attached to such vibratory element about half way between that part of such element which is opposite to the magnet poles and the support of such element, a second electrode suspended to normally rest upon and in conducting contact with the first electrode in such a manner that a line drawn from its point of suspension to its point of contact is substantially at right angles to the line of movement of the first electrode only when the latter is approximately at its extreme outer position, a spring coöperating with the first electrode to vary its pressure, substantially as hereinbefore described.

In witness whereof I have set my hand hereunto in the presence of two subscribing witnesses.

JOHN GARDNER.

Witnesses:
 WILLIAM GEO. HEYS,
 J. O'CONNELL.